US009190053B2

(12) United States Patent
Penn et al.

(10) Patent No.: US 9,190,053 B2
(45) Date of Patent: Nov. 17, 2015

(54) SYSTEM AND METHOD FOR APPLYING A CONVOLUTIONAL NEURAL NETWORK TO SPEECH RECOGNITION

(71) Applicants: Gerald Bradley Penn, Scarborough (CA); Hui Jiang, Toronto (CA); Ossama Abdelhamid Mohamed Abdelhamid, Toronto (CA); Abdel-rahman Samir Abdel-rahman Mohamed, Toronto (CA)

(72) Inventors: Gerald Bradley Penn, Scarborough (CA); Hui Jiang, Toronto (CA); Ossama Abdelhamid Mohamed Abdelhamid, Toronto (CA); Abdel-rahman Samir Abdel-rahman Mohamed, Toronto (CA)

(73) Assignees: THE GOVERNING COUNCIL OF THE UNIVERISTY OF TORONTO, Toronto (CA); Hui Jiang, Toronto (CA); Ossama Abdelhamid Mohamed Abdelhamid, Toronto (CA)

(*) Notice: Subject to any disclaimer, the term of this patent is extended or adjusted under 35 U.S.C. 154(b) by 299 days.

(21) Appl. No.: 13/849,793

(22) Filed: Mar. 25, 2013

(65) Prior Publication Data
US 2014/0288928 A1 Sep. 25, 2014

(51) Int. Cl.
G10L 15/00 (2013.01)
G10L 15/16 (2006.01)
G10L 25/30 (2013.01)
G10L 25/00 (2013.01)

(52) U.S. Cl.
CPC .............. G10L 15/16 (2013.01); G10L 25/00 (2013.01); G10L 25/30 (2013.01)

(58) Field of Classification Search
CPC .......... G10L 25/00; G10L 25/30; G10L 15/16; G06N 3/02
See application file for complete search history.

(56) References Cited

U.S. PATENT DOCUMENTS

| 6,208,963 | B1* | 3/2001 | Martinez et al. ............. 704/232 |
| 7,254,538 | B1* | 8/2007 | Hermansky et al. ....... 704/256.1 |
| 2006/0217968 | A1* | 9/2006 | Burges et al. ................ 704/205 |
| 2012/0065976 | A1* | 3/2012 | Deng et al. ................. 704/256.1 |
| 2014/0019390 | A1* | 1/2014 | Glennon et al. ............... 706/12 |

OTHER PUBLICATIONS

A. Mohamed, G. Dahl, and G. Hinton, "Acoustic modeling using deep belief networks," Audio, Speech, and Language Processing, IEEE Transactions on, 2011.
T. N. Sainath, B. Kingsbury, B. Ramabhadran, P. Fousek, P. Novak, and A. Mohamed, "Making deep belief networks effective for large vocabulary continuous speech recognition," in ASRU, 2011.
F. Seide, G. Li and D. Yu, "Conversational speech transcription using context-dependent deep neural networks," Interspeech 2011, pp. 437-440.
Y. Lecun, L. Bottou, Y. Bengio, and P. Haffner, "Gradient-based learning applied to document recognition," in Proceedings of the IEEE, 1998, pp. 2278-2324.
Y. LeCun, F. Huang, and L. Bottou, "Learning methods for generic object recognition with invariance to pose and lighting," in Proceedings of CVPR'04. 2004, IEEE Press.

(Continued)

Primary Examiner — Daniel Abebe
(74) Attorney, Agent, or Firm — Bhole IP Law; Anil Bhole

(57) ABSTRACT

A system and method for applying a convolutional neural network (CNN) to speech recognition. The CNN may provide input to a hidden Markov model and has at least one pair of a convolution layer and a pooling layer. The CNN operates along the frequency axis. The CNN has units that operate upon one or more local frequency bands of an acoustic signal. The CNN mitigates acoustic variation.

17 Claims, 4 Drawing Sheets

(56) References Cited

OTHER PUBLICATIONS

Y. LeCun and Y. Bengio, "Convolutional networks for images, speech, and time-series," in The Handbook of Brain Theory and Neural Networks, M. A. Arbib, Ed. 1995, Mit Press.

H. Lee, P. Pham, Y. Largman, and A. Ng, "Unsupervised feature learning for audio classification using convolutional deep belief networks," in Advances in Neural Information Processing Systems 22, pp. 1096-1104. 2009.

M.J.F. Gales, "Maximum likelihood linear transformations for hmm-based speech recognition," Computer Speech and Language, vol. 12, pp. 75-98, 1998.

K. F. Lee and H. W. Hon, "Speaker-independent phone recognition using hidden Markov models," IEEE Transactions on Acoustics, Speech and Signal Processing, vol. 37, No. 11, pp. 1641-1648, Nov. 1989.

G. E. Dahl, M. Ranzato, A Mohamed, and G. E. Hinton, "Phone recognition with the mean-covariance restricted boltzmann machine," in Advances in Neural Information Processing Systems, 2010, No. 23.

Eide, E.; Gish, Herbert, "A parametric approach to vocal tract length normalization,", Acoustics, Speech, and Signal Processing, 1996. ICASSP-96. Conference Proceedings., 1996 IEEE International Conference on, vol. 1, No., pp. 346-348 vol. 1, May 7-10, 1996.

J. Cohen, T. Kamm and A. G. Andreou, "Vocal tract normalization in speech recognition: Compensating for systematic speaker variability", J. Acoust. Soc. Am, vol. 97, No. 5, Pt. 2,pp. 3246-3247, May 1995.

L. Lee and R. C. Rose, "Speaker normalization using efficient frequency warping procedures", IEEE, vol. 1, pp. 353-356, May 1996.

\* cited by examiner

SYSTEM AND METHOD FOR APPLYING A CONVOLUTIONAL NEURAL NETWORK TO SPEECH RECOGNITION

TECHNICAL FIELD

The following relates generally to convolutional neural networks and more specifically to applying a convolutional neural network to speech recognition.

BACKGROUND

Systems for automatic speech recognition (ASR) are generally challenged with the wide range of speaking, channel, and environmental conditions that humans can generally handle well. The conditions may, for example, include ambient noise, speaker variability, accents, dialects and language differences. Other variations may also be present in a particular speech pattern.

These types of acoustic variations have been found to be challenging to most ASR systems that use Hidden Markov Models (HMMs) to model the sequential structure of speech signals, where each HMM state uses a Gaussian Mixture model (GMM) to model short-time spectral representation of speech signal. Better acoustic models should be able to model a variety of acoustic variations in speech signals more effectively to achieve robustness against various speaking and environmental conditions.

More recently, deep neural networks have been proposed to replace GMM as the basic acoustic models for HMM-based speech recognition systems and it has been demonstrated that neural network (NN)-based acoustic models can achieve competitive recognition performance in some difficult large vocabulary continuous speech recognition (LVCSR) tasks. One advantage of NNs is the distributed representations of input features (i.e., many neurons are active simultaneously to represent input features) that generally makes them more efficient than GMMs. This property allows NNs to model a diversity of speaking styles and background conditions with typically much less training data because NNs can share similar portions of the input space to train some hidden units but keep other units sensitive to a subset of the input features that are significant to recognition. However, these NNs can be computationally expensive to implement.

It is an object of the following to obviate or mitigate at least one of the foregoing issues.

SUMMARY

In one aspect, a method for applying a convolutional neural network to a speech signal to mitigate acoustic variation in speech is provided, the convolutional neural network comprising at least one processor, the method comprising: (a) obtaining an acoustic signal comprising speech; (b) preprocessing the acoustic signal to: (i) transform the acoustic signal to its frequency domain representation; and (ii) divide the frequency domain representation into a plurality of frequency bands; (c) providing the plurality of frequency bands to a convolution layer of the convolutional neural network, the convolution layer comprising a plurality of convolution units each receiving input from at least one of the frequency bands; and (d) providing the output of the convolution layer to a pooling layer of the convolutional neural network, the pooling layer comprising a plurality of pooling units each receiving input from at least one of the convolution units, the output of the pooling layer being a representation of the acoustic signal mitigating acoustic variation.

In another aspect, a system for mitigating acoustic variation in speech is provided, the system comprising a convolutional neural network, the convolutional neural network comprising at least one pair of: (a) a convolution layer comprising a plurality of convolution units each receiving input from at least one frequency band of an acoustic signal comprising speech; (b) a pooling layer comprising a plurality of pooling units each receiving input from at least one of the convolutional units, the output of the pooling layer being a representation of the acoustic signal mitigating acoustic variation.

DESCRIPTION OF THE DRAWINGS

The features will become more apparent in the following detailed description in which reference is made to the appended drawings wherein.

DETAILED DESCRIPTION

Figure 1:
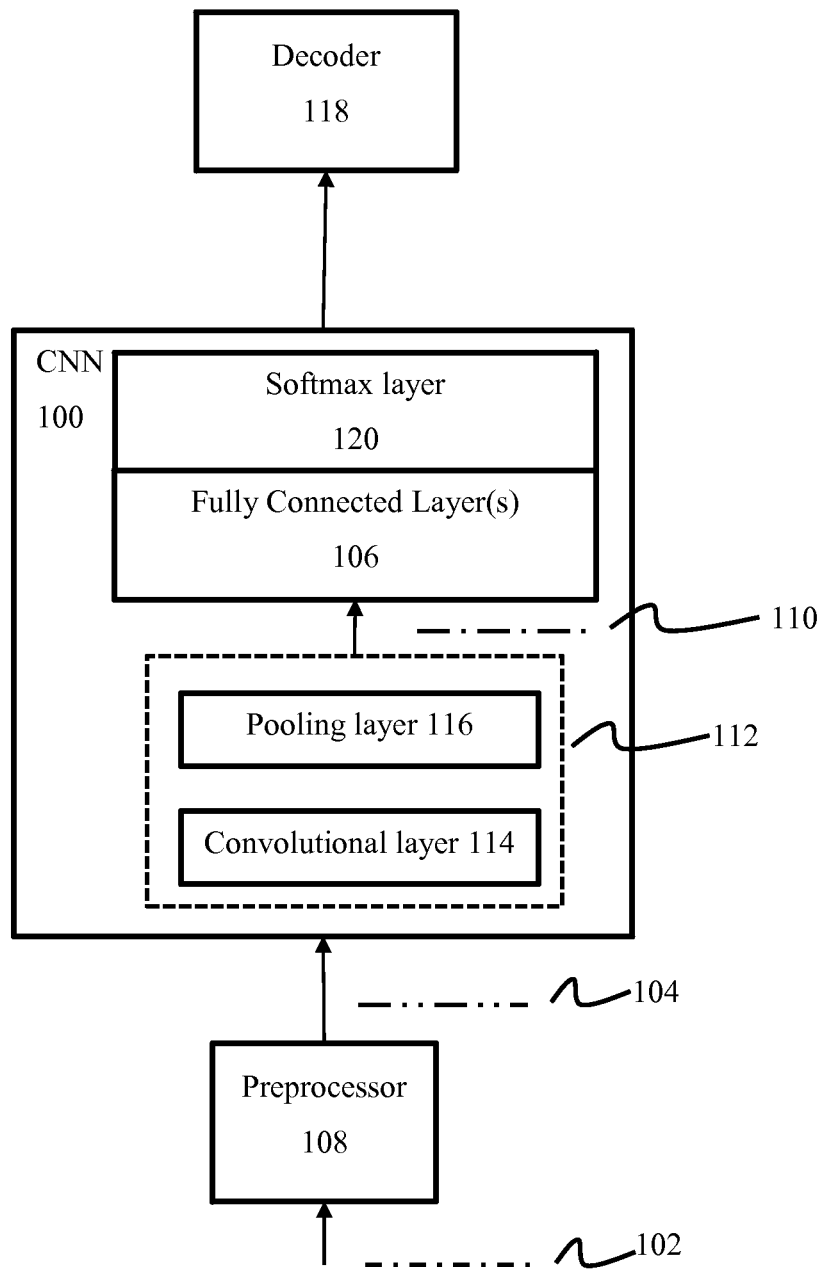
FIG. 1 is an architecture diagram of a convolutional neural network applied to speech recognition.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, engine, unit, application, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application, module or engine herein described may be implemented using computer readable/executable instructions that may be stored or otherwise held by such computer readable media.

It has been found that acoustic variation can be mitigated by processing an acoustic signal comprising speech along both time and frequency axes. By applying the CNN convolution and pooling operations along the frequency axis, substantial invariance to small shifts along the frequency axis can be achieved to normalize acoustic variation.

A CNN as described herein applies local filtering and pooling along the frequency axis to normalize speaker variance and enforce locality of features to enable an increase in speaker independent speech recognition performance. The CNN comprises at least one pair of layers comprising a convolution layer, comprising a plurality of convolution units, and a pooling layer, comprising a plurality of pooling units, to normalize spectral variations of speech signals. The spectral variations may comprise various speaking and environmental conditions, including, for example, channel noise, colored background, speaker variability, accents, dialects and language differences.

Referring now to FIG. 1, a system for applying a convolutional neural network (CNN) to speech recognition is shown. The CNN (100) may be applied to speech recognition within the framework of a hybrid NN-HMM architecture. That is, the CNN (100) may be applied to an obtained or observed acoustic signal comprising speech (102) with the output of the pooling layer feeding a fully connected hidden NN layer (106), with better speech features (110) having increased robustness to speaker and noise variations. The CNN (100) is operable to analyze spectro-temporal patches of the acoustic signal, providing the HMM component with a signal representation that may be characterized by increased robust to variances in speaker and noise conditions. The HMM component may comprise a decoding unit (decoder) (118), which may be applied to the output of the CNN to output a sequence of labels that were recognized. It will be appreciated that the decoder may alternatively operate relative to another state-based model, rather than an HMM, to output a label sequence.

A preprocessing unit (preprocessor) (108) computes speech features that are suitable for the CNN (100). These features are computed from the acoustic signal (102) prior to inputting the frequency domain representation of the signal (104) to the CNN (100). The preprocessor (108) may therefore generate, for each of a plurality of signal frames (in the time domain), a frequency domain representation of the obtained acoustic signal (102) and divide this representation into a plurality of bands (shown in FIG. 3) which are input to the CNN (100), where a band refers to a particular frequency range that is represented by a vector of features either in the input or other CNN layers' units. Alternatively, rather than the preprocessor (108) dividing the frequency domain representation into a plurality of bands, the CNN may comprise a set of filters enabling each convolution unit of the bottom layer to operate on particular bands.

The CNN comprises at least one pair of layers (112), each pair comprising a convolution layer (114) and pooling layer (116). The convolution layer (114) applies a set of kernels, each one of the kernels processing one or more bands of the layer input. Each kernel produces a learnable weight vector. The pooling layer (116) comprises one or more pooling layer units, each one of the pooling layer units applying a pooling function to one or more convolution unit kernel outputs computed at different bands using a pooling function. The pooling function may be an average or a maximum function or any other function that aggregates multiple values into a single value. Top fully connected layers may be applied to combine pooling layer units from the topmost pooling layer. A final softmax layer may finally be applied to combine the outputs of the fully connected layer using softmax functions.

The CNN is applied along the frequency axis of the observed speech signal, while the variability along the time axis of the speech signal may be normalized by application of a HMM component. The dependency between adjacent speech frames may be utilised by the application of a long time context window that feeds as input to the CNN.

The output of the CNN may be the probability $P(s \vee O_t)$ that the frame at time t belongs to an HMM state s. Generally, in an example, t may be on the order of tens of milliseconds or some other period suitable for the HMM. A decoder may be applied over the signal in the time domain to match the states to speech based on the probabilities P, where the best fit may be used to output a sequence of labels.

As previously mentioned, it has been found that speech signals typically exhibit locality characteristics along the frequency axis. Thus, different phonemes many have energy concentrations in different local bands along the frequency axis. For example, voiced phonemes have a number of formats appearing at different frequencies. The preprocessor generates frequency representations of the signal to enable the CNN to distinguish phonemes based upon the local energy patterns. As a result, kernels provided by the CNN that operate on different bands of local frequency regions may represent these local structures, and may represent combinations of these local structures along the whole frequency axis to enable the CNN to recognize output labels. The locality of processing within these kernels further enables robustness against ambient noises, particularly where noises are only concentrated in parts of the spectrum. In this situation, kernels that process bands in relatively cleaner parts of the spectrum can still detect speech features well, in order to compensate for the ambiguity of noisy parts of the spectrum.

The CNN described herein is capable of modeling these local frequency structures by enabling each dimension of each vector computed by each kernel of the convolution layer to operate upon features representing a limited bandwidth (the receptive field of the respective dimension of the kernel output vector) of the complete speech spectrum. To achieve this, the preprocessor (108) may be operable to represent the observed signal in a frequency scale that can be divided into a number of local bands. The frequency scale may, therefore, comprise any of linear spectrum, Mel-scale spectrum, filterbank features or any other locality preserving features.

Figure 2:
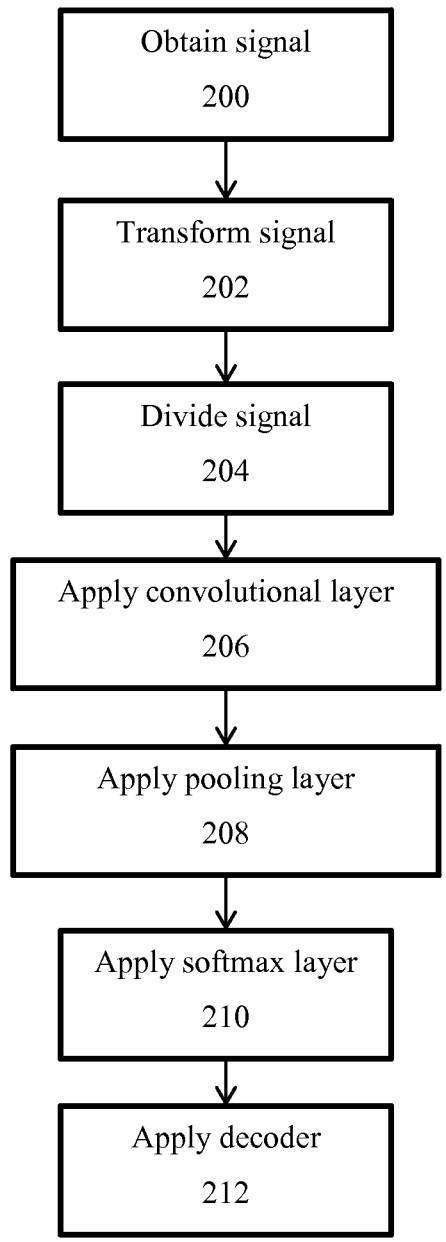
FIG. 2 is a flowchart of a method for applying a convolutional neural network to speech recognition.
Figure 3:
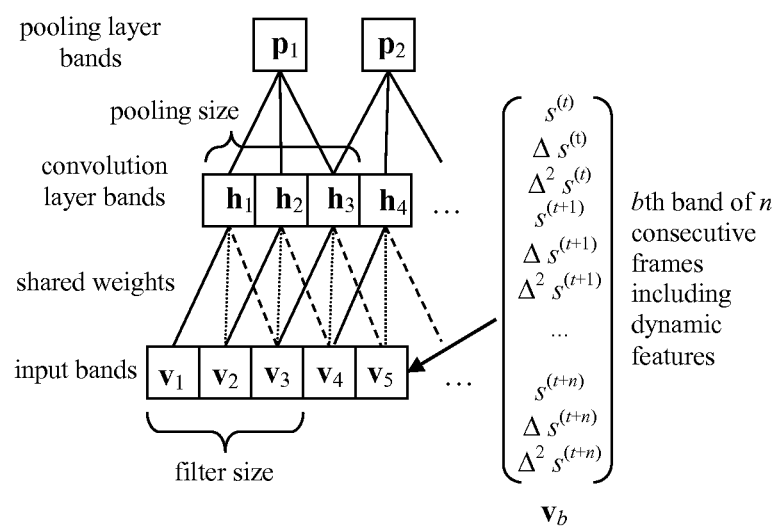
FIG. 3 is a block diagram of an exemplary convolutional neural network with full weight sharing applied to an acoustic signal.

Referring now to FIGS. 2 and 3, the preprocessor (108) obtains the acoustic signal, at block 200, and generates a speech signal υ (300) by transforming, in block 202, the observed speech signal for a particular context window (i.e., a plurality of frames) to its frequency domain representation.

In block 204, the preprocessor then divides υ into a plurality of B bands, i.e., $\upsilon=[\upsilon_1 \upsilon_2 \ldots \upsilon_B]$ where $\upsilon_b$ is the feature vector representing band b. The feature vector $\upsilon_b$ may include speech spectral features (s), delta (Δs) and acceleration (Δ²s) parameters from local band b of all feature frames within the current context window, where the window comprises c frames, as follows:

$$\upsilon_b = [s^{(t)}, \Delta s^{(t)}, \Delta^2 s^{(t)}, s^{(t+1)}, \Delta s^{(t+1)}, \Delta^2 s^{(t+1)}, \ldots, s^{(t+c)}, \Delta s^{(t+c)}, \Delta^2 s^{(t+c)}]$$

In block 206, the speech signal υ, for each particular context window, is each individually input to the convolution layer (302) which operates upon each window of the speech signal υ. Activations of the convolution layer (302) are divided into K bands where each band contains J different kernel activations. The number of bands K in the convolution layer output may be equal to the number of input bands by adding extra bands with zero values before and after the actual input bands. Each band activation may be denoted as $h_k=[h_{k,1}\ h_{k,2}\ \ldots\ h_{k,J}]$. The convolution layer activations can be computed as a convolution-like operation of each kernel on the lower layer bands followed by a non-linear activation function:

$$h_{k,j} = \theta\left(\sum_{p=1}^{P}\sum_{b=1}^{s} w_{j,b,p} v_{b+k-1,p} + a_j\right)$$

where $\theta(x)$ is the activation function, s is the kernel size in the number of input bands, P is the size of $v_b$, $w_{j,b,p}$ is the weight element representing the pth component of the bth band of the jth filter kernel. In full weight sharing, all of the K bands share the same set of filter kernels as shown in the previous equation.

This convolution layer comprises K bands where each band comprises J units. The convolution layer may be considered similar to a standard NN layer where all nodes of the hidden layer are grouped into bands and each node receives inputs only from bands of the lower layer. Moreover, weights and biases for the jth node of each band may be shared among different hidden convolution layer bands. Note that in FIG. 3, weights represented by the same line style may be shared among all convolution layer bands.

As previously mentioned, speech spectrum includes many local structures and these local structures are distributed over a range of the frequency axis, where each local structure typically appears to center around one particular frequency that can vary within a limited range. For example, central frequencies of formats for the same phoneme may vary within a limited range and typically differ between different speakers and sometimes between different utterances from the same speaker.

A pooling layer may be operable to mitigate the foregoing variability. In block 208, a pooling layer is applied to the output of the convolution layer. The pooling layer activations may be divided into M bands. Each band of the pooling layer receives input from r convolution layer neighbouring bands to generate J values corresponding to the convolution J kernels. The jth value represents the result of the pooling function on the corresponding activations of the jth convolution kernel along the r bands of the convolution layer, as shown in FIG. 3. The pooling layer may generate a lower resolution version of the convolution layer by applying this pooling operation every n convolution layer bands, where n is the sub-sampling factor. As a result, a smaller number of bands may be obtained in the pooling layer that provide lower frequency resolution features that may contain more useful information that may be further processed by higher layers in the CNN hierarchy.

The activations of the mth band of the pooling layer may be denoted as $p_m=[p_{m,1}\ p_{m,2}\ \ldots\ p_{m,J}]^T$. Each activation may be computed as:

$$p_{m,j} = \overset{r}{\underset{k=1}{\rho}} (h_{(m-1)\times n+k, j})$$

where r may be referred to as pooling size. n may be smaller than r to have some overlap between adjacent pooling bands. $\rho$ is the pooling function. Examples of this pooling function are the maximum, sum, and average but may be any summary function that can compute a single value from an arbitrary set of values, or it may be learned. The example shown in FIG. 3 has a pooling layer with a sub-sampling factor of 2 and a pooling size of 3.

Figure 4:
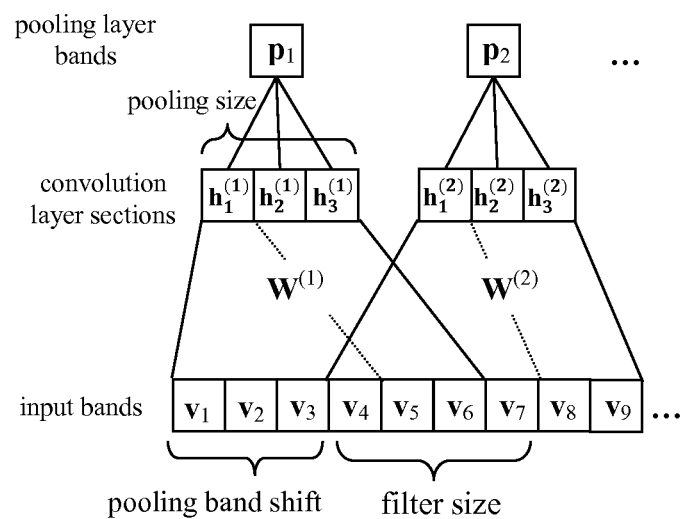
FIG. 4 is a block diagram of an exemplary convolutional neural network with limited weight sharing applied to an acoustic signal.

Referring now to FIG. 4, an exemplary CNN with limited weight sharing is shown. In a standard CNN, a full weight sharing scheme is used where the local filter weights are tied and shared for all positions or bands within the whole input space, as in FIG. 3. In this case, computation of all filters' activations may be a convolution of the filter weights and the input signals.

In speech signals, however, different local patterns appear at different frequencies. Therefore, it may be more effective to have a limited weight sharing scheme. In a limited weight sharing scheme, weight sharing is limited to those local filters that are close to one another and are pooled together in the pooling layer. This weight sharing strategy is depicted in FIG. 4, where one set of kernels weights is used for each pooling band. For example, in FIG. 4, $W^{(1)}$ represents the weights matrix shared between bands $h_1^{(1)}$, $h_2^{(1)}$, and $h_3^{(1)}$, where $h_1^{(1)}$ receives input from bands 1-4 in input layer, $h_2^{(1)}$ receives input from bands 2-5, and so on.

As a result, the convolution layer may be divided into a number of convolution sections, where all convolution bands in each section are pooled together into one pooling layer band and are computed by convolving section kernels with a small number of the input layer bands. In this case, the pooling layer activations may be computed as:

$$p_{m,j} = \overset{r}{\underset{k=1}{\rho}} (h_{k,j}^{(m)})$$

with $$h_{k,j}^{(m)} = \theta\left(\sum_{p=1}^{P}\sum_{b=1}^{s} w_{b,j,p}^{(m)} v_{m\times n+b+k,p} + a_j^{(m)}\right)$$

where $h_{k,j}^{(m)}$ is the activation of the jth kernel of the mth section of the convolution layer applied at the kth band position. In this context, n may be referred to as a band shift in the pooling layer.

It should be understood that the full weight sharing implementation as described herein is distinct from the limited weight sharing implementation described earlier. In the case of full weight sharing, the sets of weights in different bands are configured to be the same. However, this configuration does not constrain the choice of value for M, the number of bands into which the pooling layer activations may be divided. In the case of limited weight sharing as described above, however, the sets of weights in different bands are configured to be the same when the convolution layer consists of only one convolution section and, thus, when there is only a single pooling band for the entire corresponding convolution layer. In a general case, there may be multiple convolution sections, and there may be a different number of bands into which the pooling layer activations of each section may be divided.

This type of limited weight sharing may be applied only in the topmost convolution layer because the filters in different bands are not related and cannot be convoluted and pooled afterwards.

In another aspect, the CNN may comprise one or more pairs of convolution and pooling layers, where the lowest layers process a small number of input frequency bands independently to generate higher level representation with lower frequency resolution. The number of bands may decrease in higher layers. The input to each convolution layer may be padded to ensure that the first and last input bands are processed by a suitable number of kernels in the convolution layer. For example, each input may be padded by adding a number of dummy bands before and after the first and last bands, respectively, so that the number of bands is consistent between the original input and convolution layers.

In embodiments, the top layers of the CNN are fully connected to combine different local structures extracted in the lower layers for the final recognition.

In block 210, the output from the pooling layer is fed to a number of fully connected hidden layers. The posterior probabilities of output labels may be computed using a top softmax layer (120). The CNN may process each input speech utterance by generating all output label probabilities for each frame. In block 212, a decoder, such as a Viterbi decoder for example, may then be applied to obtain the sequence of labels corresponding to the input utterance.

In the training stage, the CNN may, for example, be estimated using a back-propagation technique to minimize cross entropy of targets and output layer activations. The training targets may be obtained from forced alignments generated from a trained HMM component.

In exemplary embodiments, in feature extraction, speech may be analyzed using, for example, a 25-ms frame length multiplied by a Hamming function with a 10-ms fixed frame rate. The speech feature vector may be generated by Fourier-transform-based filter-banks, which may include, for example, 40 coefficients distributed on a Mel-scale and energy, along with their first and second temporal derivatives. All speech data may be normalized by averaging over all training cases so that each coefficient or first derivative or second derivative all has zero mean and unit variance. An n-gram language model may be applied in decoding to generate the output label sequence.

In exemplary embodiments, for network training, a learning rate, annealing and early stopping strategies may be applied. The NN input layer may include a context window of 15 frames, for example. The input of the CNN may be divided into 40 bands, for example. In this example, each band may include one of the 40 filter-bank coefficients along the 15 frames context window including their first and second derivatives. Moreover, all bands of the first convolution layer may receive the energy as an extra input because it may not be suitable to treat it as a frequency band. Moreover the inputs of convolution layers may be padded as previously mentioned. Exemplary pooling sizes may be from 1 to 8, for example. Around 80 to 97 filters may be provided per band, for example.

Although the above has been described with reference to certain specific embodiments, various modifications thereof will be apparent to those skilled in the art without departing from the scope of the claims appended hereto. The entire disclosures of all references recited above are incorporated herein by reference.

We claim:

1. A method for applying a convolutional neural network to a speech signal to mitigate acoustic variation in speech, the convolutional neural network comprising at least one processor, the method comprising:
    (a) obtaining an acoustic signal comprising speech;
    (b) preprocessing the acoustic signal to:
        (i) transform the acoustic signal to its frequency domain representation; and
        (ii) divide the frequency domain representation into a plurality of frequency bands;
    (c) providing the plurality of frequency bands to a convolution layer of the convolutional neural network, the convolution layer comprising a plurality of convolution units each receiving input from at least one of the frequency bands, at least a subset of the convolution units sharing weights for computing activations from their respective local frequency bands of their input; and
    (d) providing the output of the convolution layer to a pooling layer of the convolutional neural network, the pooling layer comprising a plurality of pooling units each receiving input from at least one of the convolution units, the output of the pooling layer being a representation of the acoustic signal mitigating acoustic variation.

2. The method of claim 1, further comprising applying the preprocessing for frames of the acoustic signal and providing the frequency domain representation for each of the frames to the convolution layer.

3. The method of claim 1, further comprising providing the output of a topmost pooling layer to a fully connected layer.

4. The method of claim 3, wherein the output of the fully connected layer is a probability of the speech belonging to a certain output label.

5. The method of claim 4, further comprising providing the probability to a decoder operable to determine a desired output label sequence.

6. The method of claim 1, further comprising providing the output of the pooling layer to a further convolution layer.

7. The method of claim 1, wherein the convolution units apply a set of kernels that operate on local bands of the acoustic signal.

8. The method of claim 1, wherein the convolution units linked to a common pooling unit in the upper layer share the same weight.

9. A system for mitigating acoustic variation in speech comprising a convolutional neural network, the convolutional neural network comprising at least one pair of:
    (a) a convolution layer comprising a plurality of convolution units each receiving input from at least one frequency band of an acoustic signal comprising speech, at least a subset of the convolution units sharing weights for computing activations from their respective local frequency bands of their input;
    (b) a pooling layer comprising a plurality of pooling units each receiving input from at least one of the convolutional units, the output of the pooling layer being a representation of the acoustic signal mitigating acoustic variation.

10. The system of claim 9, further comprising a preprocessor operable to:
    (a) obtain the acoustic signal comprising speech; and
    (b) preprocess the acoustic signal to:
        (i) transform the acoustic signal to its frequency domain representation; and
        (ii) divide the frequency domain representation into a plurality of the frequency bands.

11. The system of claim 10, further comprising the preprocessor applying the preprocessing for frames of the acoustic signal and operable to provide the frequency domain representation for each of the frames to the convolution layer.

12. The system of claim 9, further comprising at least one fully connected neural network layer operable to obtain the output of the topmost pooling layer for speech recognition.

13. The system of claim 12, wherein the topmost fully connected layer is linked to a softmax layer operable to output a probability of the speech belonging to an output label.

14. The system of claim 13, further comprising a decoder operable to determine a most probable label sequences based on the probability.

15. The system of claim 9, wherein a relatively higher convolution layer-pooling layer pair is operable to obtain the output of a relatively lower convolution layer-pooling layer pair.

16. The system of claim 9, wherein the convolution units apply a set of kernels that operate on local bands of the acoustic signal.

17. The system of claim 9, wherein the convolution units that are attached to the same pooling unit in the upper layer share the same kernels weights.

* * * * *